(12) United States Patent
Ito

(10) Patent No.: US 7,322,033 B2
(45) Date of Patent: Jan. 22, 2008

(54) DISTRIBUTED CONTROL METHOD AND APPARATUS

(75) Inventor: Takafumi Ito, Toyota (JP)

(73) Assignee: DENSO CORPORATION, Kariya (JP)

( * ) Notice: Subject to any disclaimer, the term of this patent is extended or adjusted under 35 U.S.C. 154(b) by 858 days.

(21) Appl. No.: 10/396,474

(22) Filed: Mar. 26, 2003

(65) Prior Publication Data

US 2003/0187907 A1    Oct. 2, 2003

(30) Foreign Application Priority Data

Mar. 29, 2002    (JP) .............................. 2002-095748

(51) Int. Cl.
G06F 9/46    (2006.01)
G06F 3/00    (2006.01)

(52) U.S. Cl. .................... 718/104; 718/100; 718/102; 718/106; 718/107; 718/108; 719/313

(58) Field of Classification Search ............... 718/100, 718/102, 106–108, 104; 719/313
See application file for complete search history.

(56) References Cited

U.S. PATENT DOCUMENTS

| | | | |
|---|---|---|---|
| 6,112,023 A * | 8/2000 | Dave et al. .................... 703/27 |
| 6,385,638 B1 | 5/2002 | Baker-Harvey | |
| 6,578,005 B1 * | 6/2003 | Lesaint et al. ................. 705/8 |

FOREIGN PATENT DOCUMENTS

| | | |
|---|---|---|
| JP | 63-68934 | 3/1988 |
| JP | 1-143537 | 6/1989 |
| JP | A-H06-075786 | 3/1994 |

(Continued)

OTHER PUBLICATIONS

Notification of Reasons for Rejection from Japanese Patent Office issued on Jun. 6, 2006 for the corresponding Japanese patent application No. 2002-095748 (a copy and English translation thereof).

(Continued)

*Primary Examiner*—Meng-Al T. An
*Assistant Examiner*—Kenneth Tang
(74) *Attorney, Agent, or Firm*—Posz Law Group, PLC

(57) ABSTRACT

In a distributed control method of executing distributed control such that a lot of tasks distributively executed in a lot of nodes connected to a network and made to implement multitasking operations communicate a message with each other to operate cooperatively in time sequence, an estimated completion time of the distributed control is calculated by summing up the worst execution times of the processing times of all tasks pertaining to the distributed control and the communication times of all messages between the tasks and an initial value of a margin time with respect to a deadline is determined by subtracting the estimated completion time from a control cycle of the distributed control. This margin time is set for each of all the distributed control to be executed on the system and is sequentially updated in accordance with the states of the tasks and messages. The processing on the tasks or the transmission of the messages is made preferentially in the order of lengthening margin time. This assures a response time and deadline condition to be required in distributed control without imposing an excessive burden on a designer of a distributed control system.

18 Claims, 13 Drawing Sheets

FOREIGN PATENT DOCUMENTS

| | | |
|---|---|---|
| JP | 8-55091 | 2/1996 |
| JP | 8-272627 | 10/1996 |
| JP | 9-319596 | 12/1997 |
| JP | A-H10-240548 | 9/1998 |
| JP | 2001-236236 | 8/2001 |
| JP | A-2001-515242 | 9/2001 |

OTHER PUBLICATIONS

Poledna et al., Stefan. "OSEKtime: A Dependable Real—Time Fault-Tolerant Operating System and Communication Layer as an Enabling Technology for By-Wiring Applications, Automotive Safety-Critical Systems." *SAE International* No. SP-1507. Mar. 2000: 23-32.

Abbott et al., Robert. "Scheduling Real-Time Transactions: A Performance Evaluation." *ACM Transactions on Database Systems* vol. 17. No. 3. Sep. 1992: 513-560.

Abbott et al., Robert. "Scheduling Real-Time Transactions: A Performance Evaluation." *Proceedings of the 14th International Conference on Very Large Data Bases* Aug. 1988: 1-12.

\* cited by examiner

FIG. 5

| OBJECT TO BE SUPERVISED | | STATE | METHOD OF UPDATING MARGIN TIME |
|---|---|---|---|
| TASK | 1 | WAITING FOR EXECUTION | MARGIN TIME − EXECUTION WAITING TIME |
| | 2 | IN EXECUTION, BUT NOT REACHING WCET | NO CHANGE OF MARGIN TIME |
| | 3 | IN EXECUTION, AND EXCEEDING WCET | MARGIN TIME − OVERRUN TIME |
| | 4 | REACHING COMPLETION EARLIER THAN WCET | MARGIN TIME + (WCET − TASK PROCESSING TIME) |
| MESSAGE | 1 | WAITING FOR COMMUNICATION | MARGIN TIME − COMMUNICATION WAITING TIME |
| | 2 | IN EXECUTION, BUT NOT REACHING WCET | NO CHANGE OF MARGIN TIME |
| | 3 | EXCEEDING WCET AND REACHING COMPLETION | MARGIN TIME + (WCET − COMMUNICATION TIME) |
| | 4 | REACHING COMPLETION EARLIER THAN WCET | |

FIG. 6

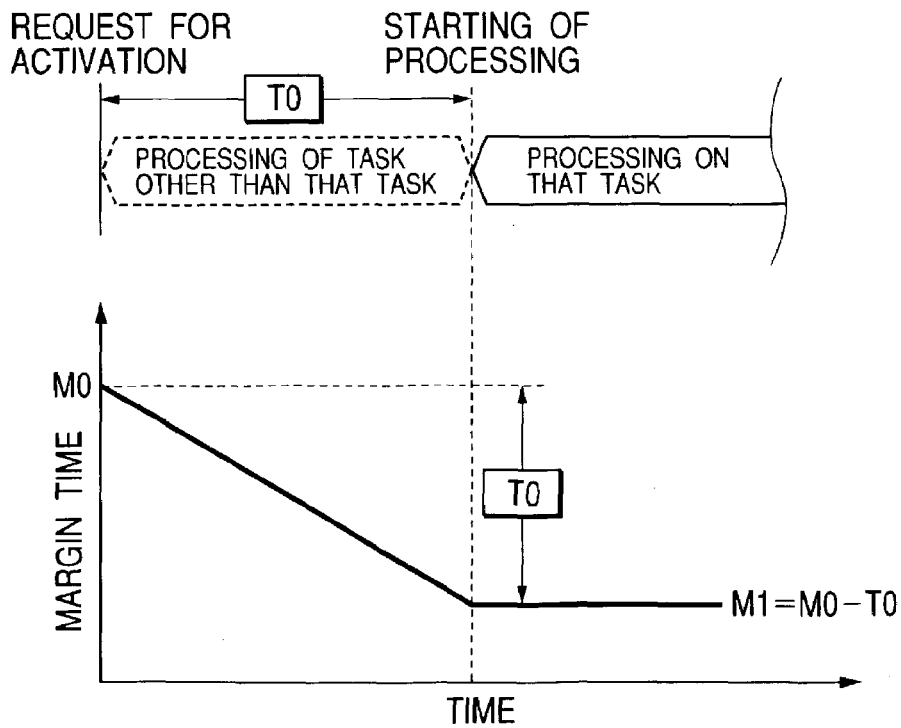

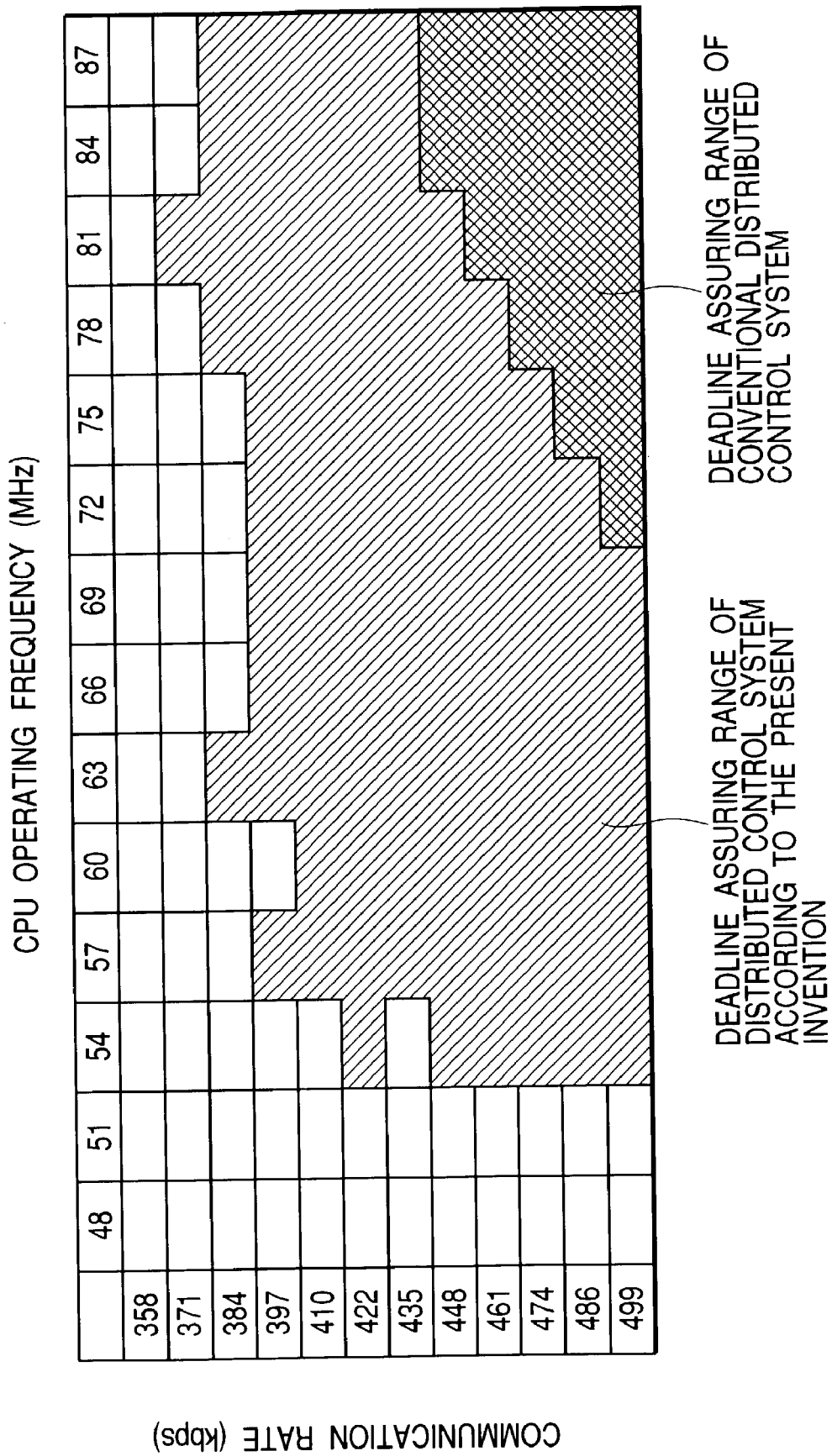

| DISTRIBUTED CONTROL | NUMBER OF TASKS/MESSAGES | | CONTROL CYCLE (msec) |
|---|---|---|---|
| | TASKS | MESSAGES | |
| 1 | 7 | 7 | 3466 |
| 2 | 4 | 4 | 1498 |
| 3 | 3 | 3 | 1360 |
| 4 | 3 | 3 | 1508 |
| 5 | 7 | 7 | 4476 |
| 6 | 10 | 10 | 4858 |
| 7 | 6 | 6 | 2956 |
| 8 | 5 | 5 | 2458 |
| 9 | 6 | 6 | 3742 |
| 10 | 8 | 8 | 3124 |
| 11 | 5 | 5 | 2744 |
| 12 | 61 | 6 | 3064 |

FIG. 15A

| MARGIN TIME | 100 | 120 | 180 | ...... |
|---|---|---|---|---|
| MESSAGE | MESSAGE C | MESSAGE A | MESSAGE B | ...... |

FIG. 15B

| MARGIN TIME | 50 | 80 | 100 | ...... |
|---|---|---|---|---|
| TASK | TASK B | TASK C | TASK A | ...... |

DISTRIBUTED CONTROL METHOD AND APPARATUS

BACKGROUND OF THE INVENTION

1) Field of the Invention

The present invention relates to a distributed control method and apparatus designed to execute distributed control through cooperative operations in a manner such that, for a lot of tasks to be distributively executed, a lot of nodes connected to a network and capable of implementing multitasking operations communicate messages to each other.

2) Description of the Related Art

So far, in fields such as an in-vehicle LAN requiring strict conditions in processing speed and processing time assurance, for constructing a distributed control system which makes a lot of nodes connected to a network execute distributed control, there have been employed a real-time operating system (which will be referred to hereinafter as a "real-time OS") whereby each of the nodes executes multitasking operations and a CSMA/CA (Carrier Sense Multiple Access/Collision Avoidance) forming a communication system for making real-time communications between the nodes.

Of these, the real-time OS sets a priority with respect to each of tasks in advance and schedules so that execution rights in the nodes (execution rights in a CPU) are allocated to the tasks in the order of decreasing priorities. Moreover, the CSMA/CA is of a communication type previously setting an ID (Identification) corresponding to a priority with respect to each message for use in communications and, when a lot of nodes transmit messages simultaneously, arbitrating so that the message having an ID with the highest priority transmits.

Thus, in a system based on a combination of the real-time OS and the CSMA/CA, the real-time performance of the system is improvable as a whole when higher priorities are allocated to tasks or messages stricter in processing time.

In addition to the above-mentioned method, there has been known a distributed control system based on a so-called time triggered method in which an execution time of each of tasks in all nodes and a communication time of each of messages between the respective nodes are set in advance for operating as set so that the distributed control to be executed distributively in the respective nodes satisfies a required condition on a deadline.

This time triggered method is written, for example, in the following documents:

S. Poledna, et. al., "OSEKtime: A Dependable Real-Time Fault-Tolerant Operating System and Communication Layer as an Enabling Technology for By-Wire Applications", SAE2000-01-1051, and Thomas Fuehrer, "The Steer-By-Wire Prototype Implementation: Realizing Time Triggered System Design, Fail-Silence Behavior and Active Replication with Fault-Tolerance Support", SAE 1999-01-0400.

A distributed control system employing this method can eliminate the task competition in a node and the communication competition between the nodes, thereby removing indeterminate operations in the system to ensure the processing time.

Meanwhile, the former distributed control system using the real-time OS and the CMSA/CA is the best effort type operations, that is, to execute as much processing as possible in a capability range of a CPU with respect to tasks with higher priorities, and, for this reason, it cannot ensure whether the processing for each task or the message communication comes to an end within a prescribed period of time.

Accordingly, for ensuring that the system fulfills the requested deadline condition, the distributed control is required to demonstrate it through the actually operation of the system. Moreover, in a case in which it cannot ensure its performance, there arises a need to change the priorities of tasks or messages, operating frequency of the CPU, transfer rate on communication, and others.

However, difficulty is encountered in clearly making a prescription about how the change in priority of task or message exerts influence on the entire control, thus resulting in requiring the change in priority and others through the use of a method of try and error. This creates a problem in an increase in the number of development steps.

In addition, in a state where the priority of task or message is in a non-optimized condition, fulfilling the requested deadline condition leads to taking up a higher CPU operating frequency or communication rate on a transmission line than is necessary, which causes an increase in manufacturing cost.

On the other hand, in the case of the latter distributed control system employing the time triggered method, a designer (user) is required to determine all the execution time of a task operating on each node and a communication time between the nodes, and for entirely satisfying the response time, control cycle and others needed in a lot of distributed control to be implemented in parallel on the system, the design therefor takes an extremely long time, which leads to an increase in development steps.

Moreover, the time triggered method requires that, also for the distributed control system when being triggered by a given asynchronous event, the task execution time and the communication time are required to be fixedly scheduled on the assumption that this event occurs at all times. This requires an excessive overhead for the processing of a CPU on a node or for the communication on a network, which not only lowers the service efficiency of the CPU or the network, but also makes it difficult to ensure the real-time performance of the processing on the asynchronous event because, irrespective of input of an asynchronous event, not until reaching the previously scheduled time the processing for that event starts. For this reason, difficulty is experienced in ensuring the real-time performance of the processing with respect to such an asynchronous event.

SUMMARY OF THE INVENTION

The present invention has been developed with a view to eliminating the above-mentioned problems, and it is therefore an object of the invention to provide a distributed control method and apparatus capable of assuring a response time and deadline condition to be required in distributed control without imposing an excessive burden on a designer of a distributed control system.

For this purpose, in a distributed control method according to a first aspect of the present invention, each of nodes sets, with respect to each of executable tasks, a margin time (which will hereinafter be referred to equally as a "margin value") representative of a difference between an estimated completion time of distributed control, the task takes partial charge of, and a deadline of the distributed control to allocate a higher execution right to each of the tasks in the order of increasing margin value.

That is, unlike the conventional system in which a task set at a low priority is postponed at all times, the priorities of the tasks always vary so that all the distributed control satisfy the deadline condition.

Accordingly, the processing can be executed with high efficiency in sequence satisfying the deadline condition without previously determining the task processing time and message transmission time. This requires only that, if the result of the actual operation shows that difficulty is encountered in satisfying the deadline condition, the CPU processing speed or the message transmission rate is increased by a value corresponding to the delay with respect to the deadline, thus considerably reducing the development steps of the distributed control system.

However, since a decision as to whether to satisfy the deadline condition depends upon a statistic manner, there is a possibility of the occurrence of violation. For completely eliminating the possibility thereof, a large overhead is required for the CPU processing and communication rate on a transmission line, thus lowering the service efficiency to the system processing ability.

For this reason, as a second aspect of the present invention, it is also appropriate that, when a margin value is smaller (shorter) than a switching decision value set in advance, the corresponding task is switched from a normal task to be used at the normal time to a simplified task shorter in execution time than the normal task.

That is, in a case in which it is assumed that the margin value makes it difficult to satisfy the deadline condition, the processing is switched at that time to the simplified task shorter in execution time to ensure an extra margin by adding a difference in execution time between the normal task and the simplified task.

In this connection, for example, for the production of a simplified task, in the case of obtaining a lot of values to calculate an average value thereof, the number of values to be obtained is decreased to shorten the processing time, and in the case of making a calculation using a lot of parameters, the previous parameters are used as a portion of the parameters to shortening the processing time. Moreover, each of the switching decision value and the simplified task is not limited to one in number but it is also acceptable that a lot of switching decision values and a lot of simplified tasks are set so that the switching among the simplified tasks to be put to use is made stepwise according to margin value.

In addition, if one distributed control is continuously executed which cannot obviously fulfill the deadline condition, the unnecessary processing therefor reduces the margin value for the other distributed control to exert adverse influence on the these other distributed control. Therefore, preferably, according to a third aspect of the present invention, when the margin value is smaller (shorter) than a discontinuation (suspension) decision value set in advance, the corresponding task is discontinued to discontinue the execution of the distributed control. Incidentally, this task execution discontinuation can be made together with the switching to a simplified task according to the second aspect of the present invention, or can also be made singly.

Meanwhile, there is a need to update the margin value so as to increase it if the processing advances with respect to an originally estimated completion time while decreasing it if delaying with respect to the originally estimated completion time.

According to a fourth aspect of the present invention, as a manner for this operation, for example, in a case in which a lot of tasks are in an executable state, the margin value for the single task having an execution right is maintained while the margin values for the other tasks waiting for the acquisition of an execution right are decreased with the passage of time until they acquire the execution right.

That is, since the execution right acquisition waiting time is an indeterminate factor inhibiting the acquisition of an estimated value of the worst time and, hence, cannot be included in the estimated completion time, when such a situation (execution right acquisition waiting state) occurs, there is a need for the margin value to be decreased by a value corresponding to that waiting time.

Moreover, according to a fifth aspect of the present invention, with respect to the task reaching completion of the execution, when the execution time thereof does not reach the worst case execution time set in advance therefor, the margin value for the distributed control to which the task pertains (which will be referred to hereinafter as "margin value (time) for task") is increased (lengthened) by a difference between the worst case execution time and the execution time and, conversely, when the execution time exceeds the worst case execution time, the margin value for that task is decreased (shortened) by the aforesaid difference therebetween. That is, the estimated completion time is obtained through the use of the worst case execution time and, hence, the margin value is increased/decreased on the basis of the worst case execution time. For example, as a case in which the task execution time exceeds the worst case execution time, it is considered that interrupt processing is activated during the execution of a task.

In this connection, according to a sixth aspect of the present invention, instead of the margin value for the task reaching completion of the execution being decreased by the aforesaid difference, when the execution time of the task acquiring the execution right overruns the worst case execution time set in advance for that task, the margin value for that task is decreased with the passage of time until the execution of that task comes to an end.

In this case, since the updating of the margin value takes place even during the execution of the task, for example, when the margin value becomes smaller than a discontinuation decision value during the execution, if the immediate termination thereof is forcibly made without waiting for the completion of that task, it is possible to minimize the adverse influence on the other distributed control (tasks) stemming from the useless execution of the distributed control (task) which does not meet the deadline condition.

Meanwhile, since the arbitration among the messages to be transmitted from the respective nodes takes place on the network, the message transmission can be kept waiting because of losing in that arbitration or the like and, as a result, a lot of messages can fall into a transmission stand-by state. For coping with such a situation, according to a seventh aspect of the present invention, as in the case of controlling the task, on the basis of the margin value (time) for the distributed control to which the message pertains (which will be referred to hereinafter as "margin value (time) for message"), a message transmission right is allocated preferentially in the order of increasing margin value. Moreover, according to an eighth aspect of the present invention, when the margin value is smaller than a switching decision value set in advance, the corresponding message is switched from a normal message to be used at an ordinary time to a simplified message smaller in size than the normal message, i.e., taking a shorter time for the communication.

In this connection, in the case of the employment of the simplified message, it is also appropriate that a lot of simplified messages are prepared so that the simplified message to be put to use is switched stepwise according to margin value.

Moreover, in this case, in addition to the updating according to the task execution state, the margin value is required to be updated according to the message handling state.

For example, there is a request for a lot of messages, with respect to the single message having the communication right, the margin value therefor is maintained, and according to a ninth aspect of the present invention, with respect to the other messages waiting for the acquisition of the communication right, the margin value therefor is decreased with the passage of time until acquiring the communication right.

Still moreover, with respect to the message which has acquired the communication right, according to a tenth aspect of the present invention, when an estimated communication time to be taken from which the communication right is acquired until the communication comes to an end in the case of assuming that the transmission is made successfully at the next transmission occasion does not reach (is shorter than) the worst case communication time set in advance, the margin value for that message is increased by a value corresponding to the difference between the worst case communication time and the estimated communication time. On the other hand, when the estimated communication time exceeds the worst case communication time, the margin value for that message is decreased by the value corresponding to the difference therebetween.

Incidentally, the reason that, instead of the actual communication time, the estimated communication time is used unlike the case for the task is that, as will be mentioned later, in the case of transmitting a margin value together with a message, even if the margin value is updated after the completion of the transmission, the updated margin value cannot be transmitted together with the message.

In addition, although a dedicated means can be provided as a means to transfer the margin value for the distributed control from the previously executed task to the task to be executed in the next place, it is also appropriate that, according to an eleventh aspect of the present invention, in transmitting a message, time information indicative of a margin value for that message is transmitted together with that message.

Still additionally, according to a twelfth aspect of the present invention, in setting a margin value for a task at the time of the activation of that task, for the first task to be activated initially in the distributed control, an initial value of the margin value prepared in advance is set as the margin value, and for the other task, other than the first task, to be activated upon receipt of a message, a value based on the time information inserted into that message is set as the margin value.

Moreover, according to a thirteenth aspect of the present invention, in a case in which a message is transmitted through the use of a frame according to the CSMA/CA method, the time information is inserted in an area of the frame to be used for the arbitration control on the network. In this case, if the time information is encoded so that the priority becomes higher on the network as the margin value becomes smaller, a message with a short margin value is transmitted preferentially even on the network, thereby further improving the real-time performance of the distributed control system.

Incidentally, it is also acceptable that the margin value is directly used as the time information, or that only bits (for example, several high-order bits) forming a portion of bit data indicative of the margin value are used as the time information. Moreover, it is also possible that, for example, a value obtained by converting the data indicative of the margin value through the use of a log scale or the like is used as the time information.

Furthermore, in a distributed control apparatus according to a fourteenth aspect of the present invention, activation time setting means, when a first task to be initially executed in distributed control is put into activation, sets, as a margin value for the task, an initial value of margin value prepared in advance, and when a task other than the first task is activated in response to reception of a message by message transmitting/receiving means, a value based on time information received together with the message is set as a margin value for the task.

In addition, on the basis of margin values set for tasks activated to be executable, task scheduling means allocates an execution right preferentially in the order of increasing margin value. The margin value is sequentially updated by first updating means in accordance with an execution state of each of the tasks by the task scheduling means.

Still additionally, message transmitting/receiving means transmits a message, produced by a task to which the task scheduling means gives an execution right, together with time information representative of a margin value for that message through a network. Another apparatus, when receiving that message through the network, repeatedly conducts processing in like manner, thus realizing the distributed control.

Moreover, according to a fifteenth aspect of the present invention, on the basis of the margin values for the messages, a message transmission right in the message transmitting/receiving means is allocated preferentially in the order of increasing margin value. That is, in the case of message scheduling means being provided to realize the method according to the seventh aspect of the present invention, according to a sixteenth aspect of the present invention, second updating means sequentially updates the margin value set by the activation time setting means in accordance with an execution state of the transmission of each of the messages by the message transmitting/receiving means.

In this configuration, it is also appropriate that the task scheduling means realizes the methods according to the second and third aspects of the present invention, the first updating means realizes the methods according to the fourth to sixth aspects of the invention, the message scheduling means realizes the method according to the eighth aspect of the invention, the message transmitting/receiving means realizes the methods according to the eleventh and thirteenth aspects of the invention, the second updating means realizes the methods according to the ninth and tenth aspect of the invention, and the activation time setting means realizes the method according to the twelfth aspect of the invention.

That is, the distributed control apparatus according to the fourteenth to sixteenth aspects of the invention are for realizing the distributed control methods according to the first to thirteenth aspects of the invention, so the corresponding effects are attainable.

BRIEF DESCRIPTION OF THE DRAWINGS

Other objects and features of the present invention will become more readily apparent from the following detailed description of the preferred embodiments taken in conjunction with the accompanying drawings in which:

FIG. 5 is an illustration of details of a margin time updating method;

FIG. 6 is an illustration useful for explaining a margin time updating method when a task is in an execution waiting state;

FIG. 13 is an graphic illustration of simulation results for making a comparison with the effects of a conventional system;

FIGS. 15A and 15B are illustrations useful for explaining detailed examples of message scheduling and task scheduling.

DESCRIPTION OF THE PREFERRED EMBODIMENTS

Embodiments of the present invention will be described hereinbelow with reference to the drawings.

First Embodiment

Figure 1:
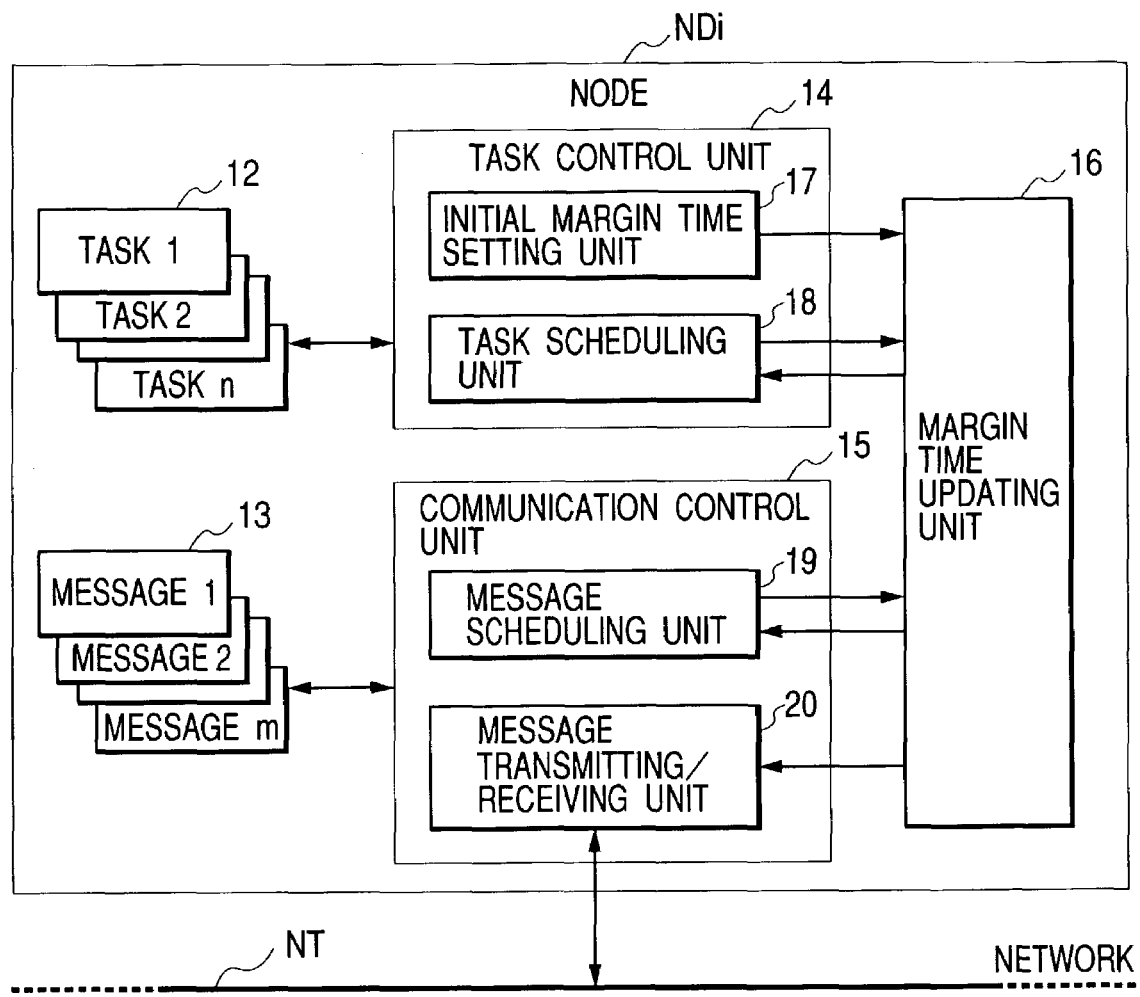
FIG. 1 is a block diagram showing an internal configuration of a node constituting a distributed control system according to a first embodiment of the present invention.

FIG. 1 is a block diagram showing an internal configuration of a node forming a distributed control system constituting a distributed control system.

As FIG. 1 shows, a distributed control system according to this embodiment is made up of a lot of nodes NDi (showing only one in the illustration) connected to each other through a network NT, and the respective nodes NDi are linked with each other to execute a lot of distributed control processing in parallel.

In this case, the distributed control signifies a series of control realized in a manner such that a lot of tasks to be distributively conducted in the lot of nodes NDi communicate messages with each other to operate cooperatively in time sequence. That is, in a case in which the tasks adjacent to each other in time sequence are placed in different nodes, the communication of messages is made between the tasks.

In addition, the respective nodes NDi have the same or similar configuration, and each of the nodes NDi is composed of a task control unit 14 for managing a task group 12 forming a set of tasks, a communication control unit 15 for managing a message group 13 forming a set of messages produced by the tasks constituting the task group 12, and a margin time updating unit 16 serving as first and second updating means to sequentially update a margin time (described later) set for a task or message in conjunction with each of distributed control.

Of these components, the communication control unit 15 includes a message transmitting/receiving unit 20 functioning as a message transmitting/receiving means to transmit/receive a message produced by each of the tasks through the network NT, and a message scheduling unit 19 acting as a message scheduling means for giving, on the basis of a margin time updated by the margin time updating unit 16, a message transmission right in the message transmitting/receiving unit 20 preferentially to a message with a short margin time.

That is, in the message scheduling unit 19, for example, as shown in FIG. 15A, in a case in which there exist a message A having a margin time of 120 ms, a message B having a margin time of 180 ms and a message C having a margin time of 100 ms, the messages are arranged in the order of the message C, the message A and the message B on a queue of messages waiting for transmission, and the first message C is transmitted by the message transmitting/receiving unit 20.

Following this, the margin time updating unit 16 updates the margin time for each of the messages and in a case in which, as a result, the message A has a margin time shorter than that of the message C, if the message C is not yet transmitted by the message transmitting/receiving unit 20 because of losing in the arbitration, the message transmitting/receiving unit 20 transmits the message A prior to the message C.

Figure 2:
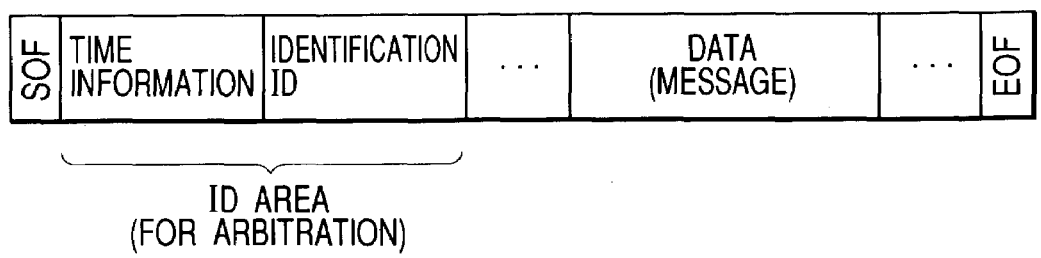
FIG. 2 is an illustration useful for explaining a configuration of a frame to be transmitted on a network.

FIG. 2 is an illustration useful for explaining a configuration of a frame the message transmitting/receiving unit 20 transmits through the network NT. This frame is for implementing communication control according to the CSMA/CA method, and has a well-known configuration except an identification (ID) area to be used for arbitration control on the transmission line. Therefore, a description thereof will be given of only this ID area. The ID area of the frame to be transmitted/received by the message transmitting/receiving unit 20 is divided into the first half and the second half, with time information corresponding to a margin time being inserted into the first half and an identification ID for identifying a message being put in the second half.

That is, in a frame produced by the message transmitting/receiving unit 20, there are placed a message produced by a task and time information representative of a margin time for distributed control to which the message pertains. Moreover, when frames are simultaneously transmitted from a lot of nodes NDi, the frame having the smallest one of the values inserted thereinto as the time information (margin time) survives to acquire a transmission right while the other frames which could not acquire the transmission right wait for the next transmission chance (the transmission completion timing of a frame which is in transmission).

Furthermore, as FIG. 1 shows, the task control unit 14 is made up of an initial margin time setting unit 17 for setting, with respect to a task, a margin time for distributed control the task takes partial charge of at the time of activation (starting) of that task, and a task scheduling unit 18 comprising a so-called real-time OS for successively assigning an execution right to each of the tasks according to the priority given thereto.

In the task scheduling unit 18, a margin time is used as the priority and the execution right is given preferentially to a task with a shorter (smaller) margin time.

For example, when a task A having a margin time of 100 ms, a task B having a margin time of 50 ms and a task C having a margin time of 80 ms are simultaneously activated as shown in FIG. 15B, the task scheduling unit 18 arranges the tasks in the order of the task B, the task C and the task A on a queue of tasks waiting for execution so that the first task B is processed on a CPU. Moreover, the margin time updating unit 16 updates the margin times and in a case in which, as a result, the task C has a margin time shorter than that of the task B, the execution of the task B is interrupted while the execution of the task C starts.

Furthermore, in a case in which, of the managing tasks, there is the first task (existing at the head position in a time sequence) to be initially executed in the distributed control, the initial margin time setting unit 17 stores an initial value of the margin time for the distributed control to which the first task pertains. In this state, if a request for activation of a task occurs, when the task is the first task, an initial value of the margin time stored in advance is set as a margin time for that task. On the other hand, when the task is a task other than the first task upon receipt of a message, a value based on time information indicated in the received message is set as the margin time therefor.

Figure 3A:
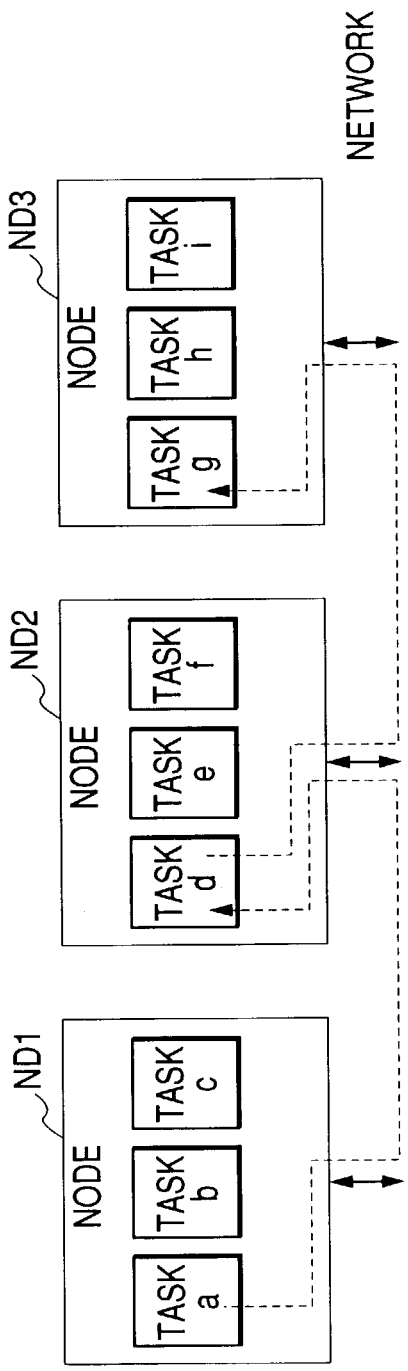
FIGS. 3A and 3B are illustrations useful for explaining a method of calculating a margin time (value)
Figure 3B:
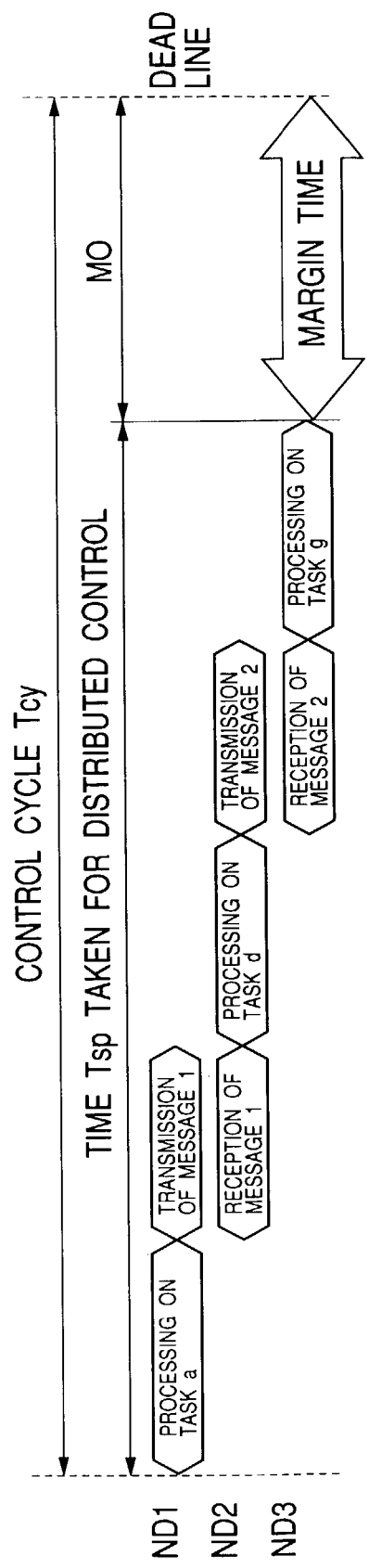

FIGS. 3A and 3B are illustrations useful for explaining a method of obtaining an initial value of the margin time. For the explanation, in this case, let it be assumed that, as shown in FIG. 3A, a node ND1 executes tasks a to c, a node ND2 executes tasks d and e and a node ND3 executes tasks g to i and, of these, the task a in the node ND1, the task d in the node ND2 and the task g in the node ND3 are implemented for distributed control in a state where the task a is taken as the first task and the processing is then conducted in the order of the task d and the task g.

In this case, since the tasks a, d and g are placed in different nodes ND1 to ND3, as shown in FIG. 3B, the communication of a message 1 takes place between the task a and the task d while the communication of a message 2 takes place between the task d and the task g. Moreover, in this distributed control, let it be assumed that there is a deadline determined by a control cycle Tcy on the basis of a starting point of the processing of the task and the processing of the task g existing at the end in the time sequence is required to be completed before this deadline.

At this time, when the worst case execution times (WCETs) of the tasks a, d and g are taken to be WCET#a, WCET#d and WCET#g, respectively and the worst case execution times of the messages 1 and 2 are taken as WCET#1 and WCET#2, respectively, the time (estimated completion time) Tsp needed for the distributed control is given by the following equation (1).

$$Tsp = WCET\#a + WCET\#d + WCET\#g + WCET\#1 + WCET\#2 \quad (1)$$

That is, the estimated completion time Tsp of this distributed control is calculated by adding the WCETs of all the processing included in the distributed control. Moreover, an initial value M0(=Tcy−Tsp) of the margin time is obtained by subtracting the estimated completion time Tsp from the control cycle Tcy and is stored in the initial margin time setting unit 17 of the node ND1 in which the first task a is placed.

The margin time the initial margin time setting unit 17 sets at the time of the activation (dormant state→running state) of a task is sequentially updated (renewed) by the margin time updating unit 16, and when the task comes to an end (running state→dormant state), the margin time for that task is taken over by a message produced by that task.

Secondly, referring to a flow chart of FIG. 4, a description will be given hereinbelow of the processing to be conducted by the margin time updating unit 16. This processing is conducted periodically at a constant interval equal to the minimum time to be managed as the margin time.

When this processing starts, a decision is made as to whether, of a group of tasks the task control unit 14 manages, there is a task which is in an activated state (in a waiting state, or in a running state) and in a margin time non-updated state (step S110). If a non-updated task exists, a state of that task is confirmed (S120) and the margin time is updated according to the confirmed state (S130).

Subsequently, a decision is made as to whether, as a result of the updating, the margin value (time) becomes larger (longer) than a threshold (execution discontinuation decision value) set in advance (S140). If it exceeds the execution discontinuation (suspension) decision value, the operational flow returns directly to the step S110. On the other hand, if the margin value (time) is equal to or smaller than the execution discontinuation decision value, the task which is in an activated state (in an execution waiting state or in execution) is placed into a suspended state (S150), and the termination of the task is notified to the task scheduling unit 18 (S160), thereafter returning to the step S110.

If the decision of the aforesaid step S110 shows the completion of the updating of the margin times for all the tasks which are in an activated state, or the absence of an activated task and the absence of a non-updated task, a decision is made as to whether, of a group of messages the communication control unit 15 manages, there is a message which is not updated in margin time (S170). If a non-updated message exists, the state of that message is confirmed (S180) and the margin time is updated according to the confirmed state (S190).

Moreover, a decision is made as to whether, as a result of the updating, the margin value is larger than a threshold (transmission discontinuation decision value) set in advance (S200). If the margin value is larger than the transmission discontinuation decision value, the operational flow returns directly to the step S170. On the other hand, if the margin value is equal to or smaller than the transmission discontinuation decision value, the message which is in transmission or in transmission waiting state is abandoned (S210) and the abandonment of the message is notified to the message scheduling unit 19 (S220), and the operational flow returns to the step S170.

On the other hand, If the decision of the aforesaid step S170 shows the completion of the updating of the margin times for all the messages, or the absence of a message to be transmitted and the absence of a non-updated message, then the processing comes to an end.

In this connection, for example, the execution discontinuation decision value and the transmission discontinuation decision value can be uniformly set at zero in each task so that the task execution or the message transmission is suspended when the margin time reaches zero (elapses). Moreover, in a case in which there is a possibility that the subsequent task execution or message transmission comes to an end before the WCET and the margin time returns to a value above zero, the execution discontinuation decision value and the transmission discontinuation decision value can also be set at a value below zero.

FIG. 5 is an illustration of details of the margin time updating method to be conducted in the aforesaid steps S130 and S190. For supervision to be conducted with respect to each of a task (S130) and a message (S190), the updating of the margin time is classified into four cases according to each of task and message states as shown in FIG. 5.

In this configuration, the task scheduling unit 18 is equipped with a timer for measuring an elapsed time after the acquisition of an execution right (which will be referred to hereinafter as a "processing execution time") with respect to a task which acquires an execution right and is in an executed state, and a timer for measuring an elapsed time after activation (referred to hereinafter as a "processing stand-by time") with respect to each of tasks which are placed into activation but being placed into an execution waiting state without acquiring the execution right.

Likewise, the message scheduling unit 19 is equipped with a timer for measuring an elapsed time after the acquisition of a transmission right (which will be referred to hereinafter as a "transmission execution time") with respect to a message which acquires a transmission right and is in a transmitted state, and a timer for measuring an elapsed time after the production of a message (referred to hereinafter as a "transmission stand-by time") with respect to each of messages which are produced but being placed into a transmission waiting state without acquiring the transmission right.

First, a description will be given hereinbelow of the four cases in the case of tasks forming the supervisory object (S130).

The first case is that a task is in a waiting state, and in this case, an increment of the processing stand-by time is subtracted from a margin time with the passage of time.

The second case is that a task is in a running state and the task processing execution time does not reach (is shorter than) a WCET used for obtaining an initial value of the margin time. In this case, no updating of the margin time takes place and the value is made intact.

The third case is that a task is in a running state and the task processing execution time exceeds a WCET. In this case, the overrun time is subtracted from the margin time.

The fourth case is that a task being in a running state completes the processing earlier with respect to a WCET. In this case, the difference between the WCET and the execution processing time is added to the margin time.

Each of these cases will be described hereinbelow with reference to the graphic illustrations of FIGS. 6, 7A and 7B.

First, an initial value (which will be referred to hereinafter as an "activation margin time") M0 of the margin time is set in response to activation of a task. At this time, when another task with a higher priority (a shorter margin time) exists and the task to be updated enters a waiting state, which corresponds to the aforesaid first case, as shown in FIG. 6, the margin time therefor is shortened in proportion to its processing stand-by time until it acquires an execution right and starts the processing. Moreover, when the task processing stand-by time is finally T0, the margin time M1 at the time of the acquisition of an execution right and the starting of the processing (which will be referred to hereinafter as a "processing start margin time") becomes M1=M0−T0. However, if the task acquires the execution right and starts the processing immediately after activated, since the processing stand-by time T0 is T0=0, the processing start margin time M1 becomes M1=M0.

A case from when the processing starts until a WCET elapses corresponds to the above-mentioned second case, and the margin time is maintained to be M1.

Figure 7A:
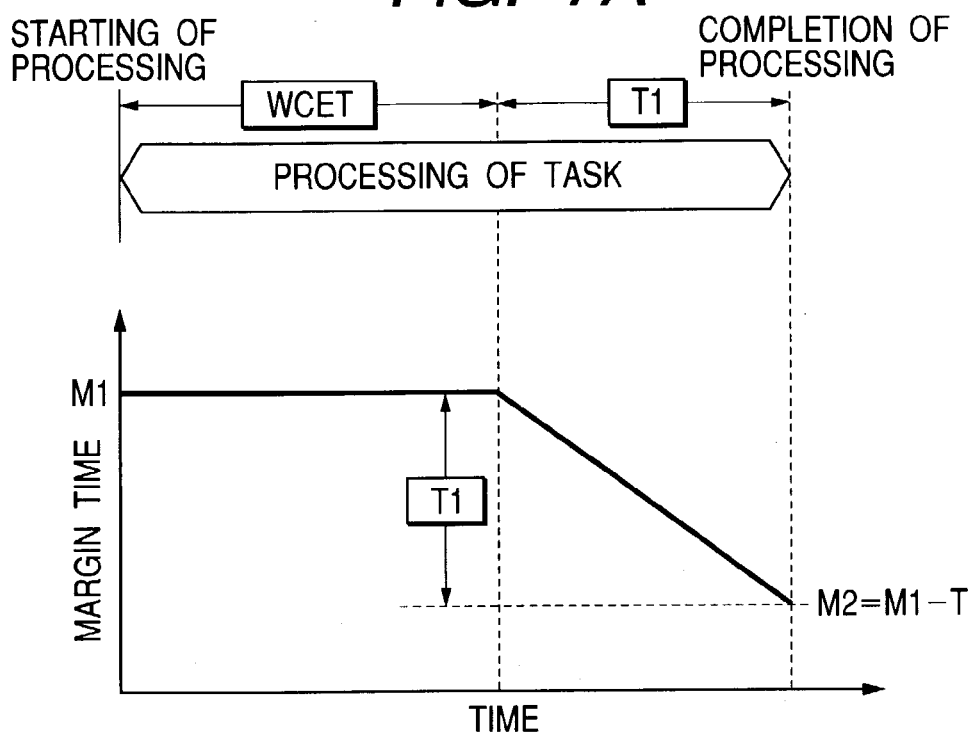
FIGS. 7A and 7B are illustrations useful for explaining margin time updating methods when a task execution time is longer than WCET and when being short than WCET.

Thereafter, when the task processing execution time overruns the WCET for that task, which corresponds to the above-mentioned third case, as shown in FIG. 7A, after the overrun with respect to the WCET, the margin time is shortened in proportion to the degree of the overrun (overrun time), and when the task processing execution time finally exceeds the WCET by T1, the margin time M2 at the time that the task reaches completion (which will be referred to hereinafter as a "processing completion margin time") becomes M2=M1−T1.

Figure 7B:
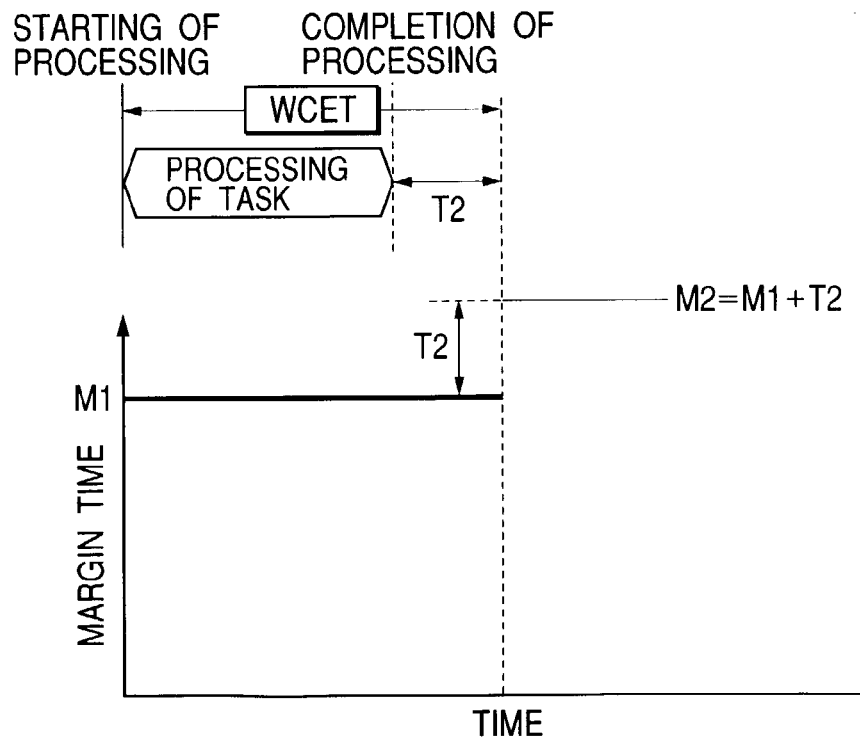

On the other hand, when the task processing execution time does not reach the WCET at the time of the completion of the task, which corresponds to the above-mentioned fourth case, as shown in FIG. 7B, if the task reaches completion earlier by T2 than the WCET, the margin time M2 at the processing completion becomes M2=M1+T2.

Incidentally, in the third case, although the overrun time with respect to the WCET is sequentially subtracted from the margin time during the execution of the task, it is also appropriate that the overrun time is subtracted from the margin time at the time of the completion of the task.

Furthermore, a description will be given hereinbelow of the four cases in the case of messages forming the supervisory object (S190).

That is, the first case is that a message is in a transmission waiting state, and in this case, an increment of the transmission stand-by time is subtracted from the margin time with the passage of time.

The second case is that a message is in a transmitting state and the transmission thereof starts actually. In this case, since there is no need to update the margin time, no updating of the margin time takes place.

The third case is that a message is in a transmitted state but the transmission thereof does not start actually and the transmission thereof is made successfully at the next transmission chance so that the message transmission processing time overruns a WCET. In this case, the overrun time with respect to the WCET is subtracted from the margin time.

The fourth case is that a message is in a transmitted state but the transmission thereof does not start actually and the transmission thereof is made successfully at the next transmission chance so that the message transmission processing time does not reach the WCET. In this case, the difference between the WCET and the execution processing time is added to the margin time.

Figure 8:
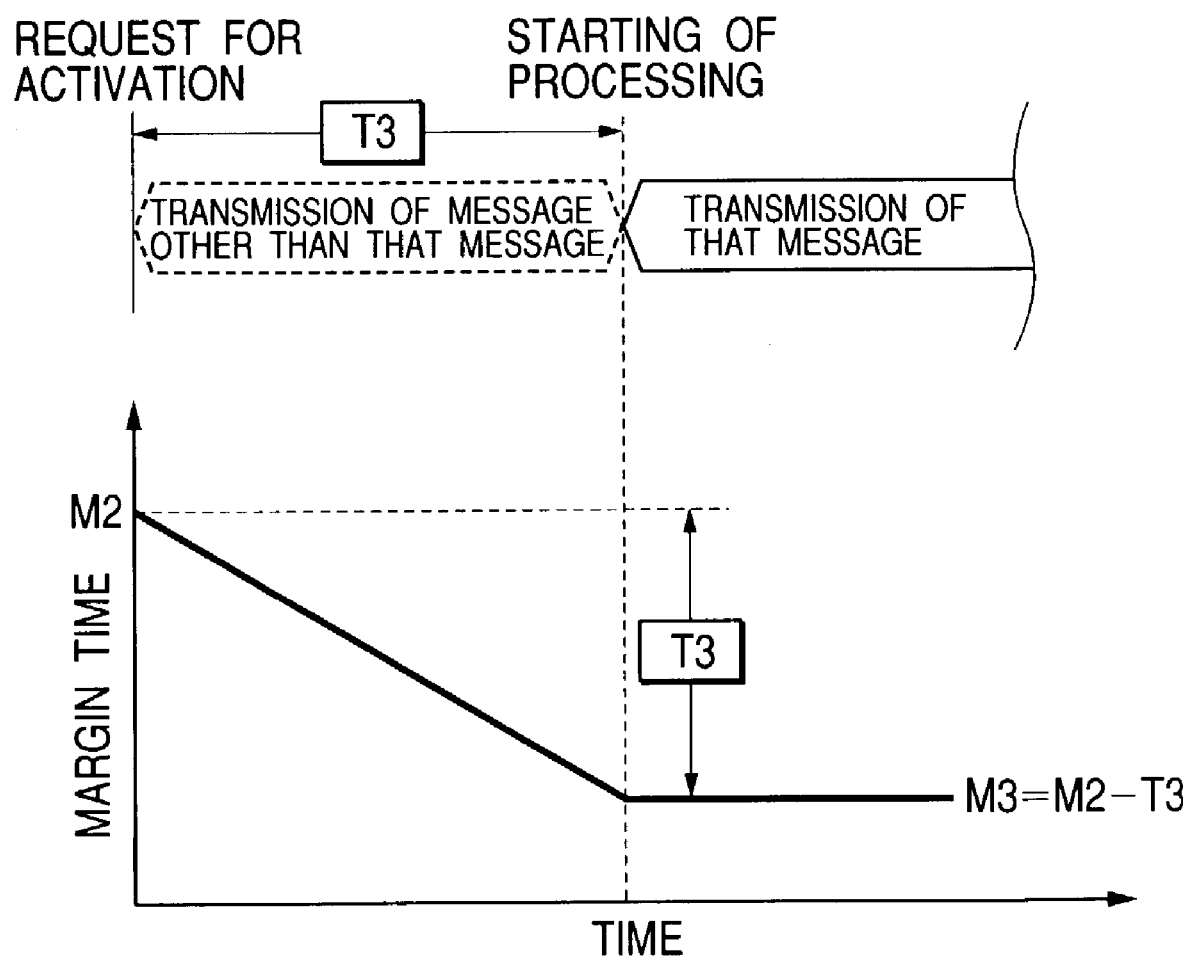
FIG. 8 is an illustration useful for explaining a margin time updating method when a message is in a transmission waiting state.

Each of these cases will be described hereinbelow with reference to the graphic illustrations of FIGS. 8, 9A and 9B.

First, when a message transmission request takes place, as a margin time (which will be referred to hereinafter as a "transmission request margin time"), a margin time M2 at the time of the completion of the processing on a task which has produced the message is set. At this time, if another message with a higher priority (shorter margin time) exists and the message enters a transmission waiting state, which corresponds to the above-mentioned first case, as shown in FIG. 8, the margin time is shortened in proportion to its transmission stand-by time until the message acquires a transmission right and the transmission thereof starts. Moreover, assuming that the message transmission stand-by time finally becomes T3, a margin time M3 at the time that the message acquires the transmission right and enters an in-transmission state (which will be referred to hereinafter as a "transmission start margin time") becomes M3=M2−T3. However, in a case in which it acquires the transmission right and enters the in-transmission state immediately after the occurrence of a message transmission request, since the transmission stand-by time T3 is T3=0, the transmission start margin time M3 becomes M3=M2.

When the transmitting state and the actual starting of the transmission are made in this way, which corresponds to the above-mentioned second case, no updating of the margin time takes place.

Figure 9A:
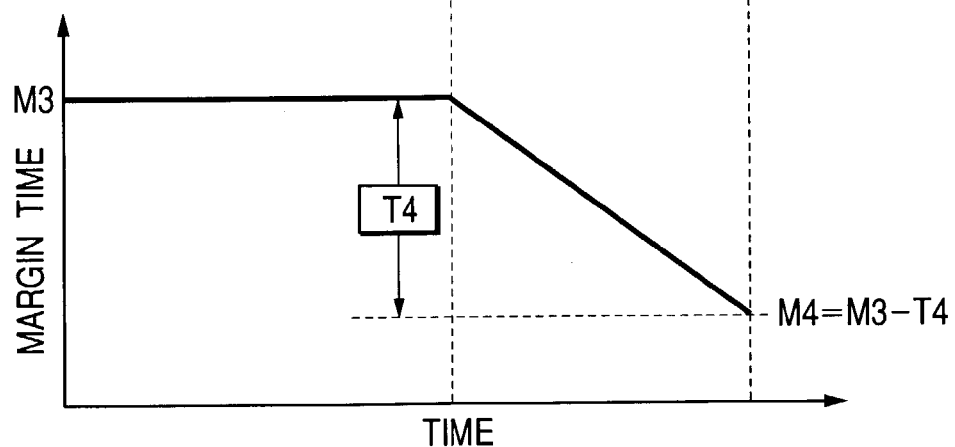
FIGS. 9A and 9B are illustrations useful for explaining margin time updating methods when a message communication time is longer than WCET and when being short than WCET.
Figure 9B:
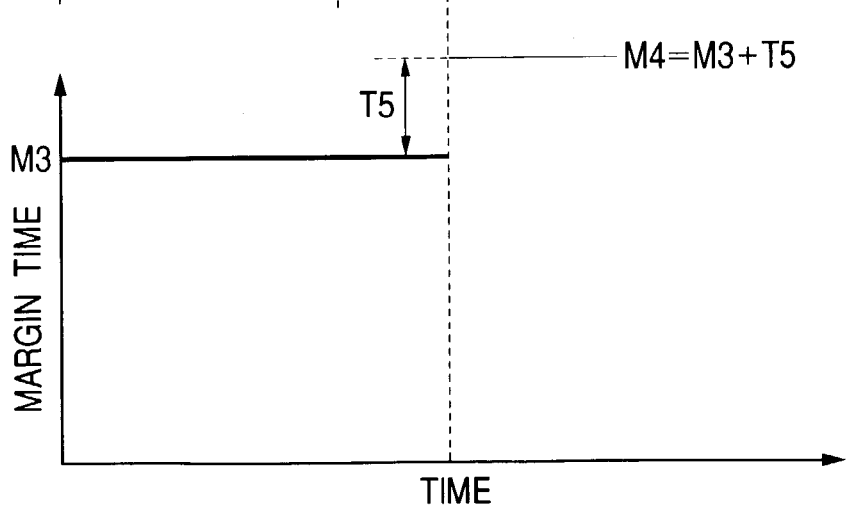

On the other hand, in a case in which a message is in a transmitted state but a situation corresponding to the above-mentioned third case occurs, as shown in FIG. 9A, assuming that the overrun time of the message with respect to the WCET is T4, the margin time is updated to a margin time (which will be referred to hereinafter as a "processing completion margin time") M4(=M3−T4) at the time of the completion of the transmission on the assumption that the message is successfully transmitted at the next transmission chance.

Moreover, in a case in which a message is in a transmitted state but a situation corresponding to the above-mentioned fourth case occurs, assuming that the difference between the WCET of the message and the transmission processing time is T5, the margin time is updated to the procession completion margin time M4(=M3+T5).

In the distributed control system made in this way according to this embodiment, in each of the nodes NDi, a task having a shorter margin time acquires an execution right preferentially and a message having a shorter margin time acquires a transmission right preferentially. Moreover, on the transmission line, a frame carrying a message having a shorter margin time is transmitted more preferentially.

Referring to a timing illustration of FIG. 10, a description will be given hereinbelow of examples of a task control operation and a communication control operation in each node of the distributed control system according to this embodiment.

First, as a system configuration, as shown in FIG. 3A, let it be assumed that the node ND1 executes the tasks a, b and c, the node ND2 executes the tasks d, e and f, and the node ND3 executes the tasks g, h and i and distributed control 1 to be executed in the order of the task a (node ND1)→the task d (node ND2)→the task g (node ND3) and distributed control 2 to be executed in the order of the task e (node ND2)→the task h (node ND3)→the task c (node ND1) are implemented in parallel in the respective nodes ND1 to ND3. In this case, for better understanding only, let it be assumed that all the tasks and all the messages are processed for a time according to a WCET used for the calculation of the initial value of the margin time.

Figure 10:
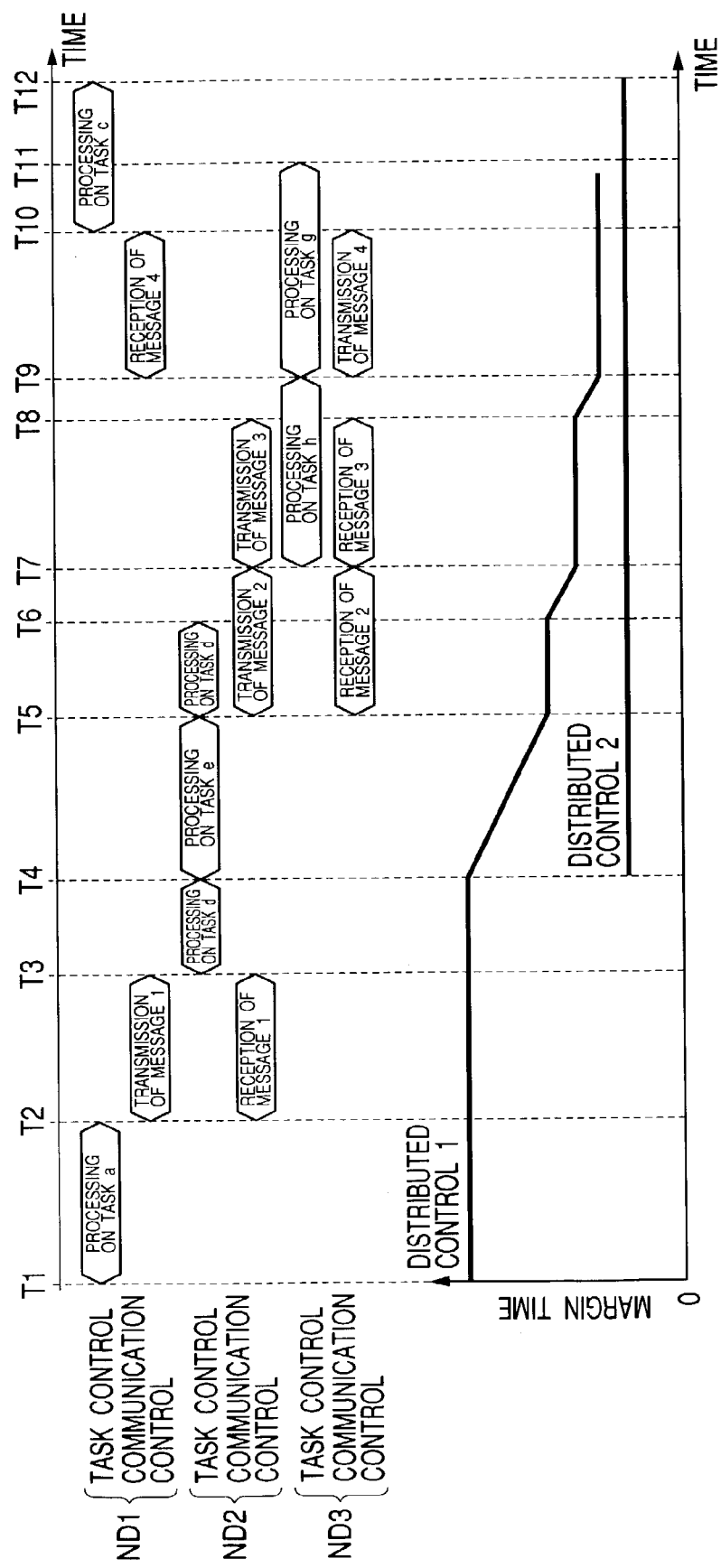
FIG. 10 is a timing chart showing an example of an operation of the distributed control system according to the first embodiment.

As FIG. 10 shows, first, when a request for the starting of the distributed control 1 occurs at time T1, the processing on the task a starts in the node ND1.

When the processing on the task a comes to an end at time T2, the transmission of a message 1 produced by the task a starts. Since the processing on the task a has been conducted without entering an execution waiting state in the meantime (in the time period between the times T1 and T2), an increase/decrease (lengthening/shortening) in the margin time does not take place in the distributed control 1.

The node ND2 receives the message 1, and when the communication of the message 1 comes to an end at time T3, the node ND2 activates the processing on the task d for the distributed control 1 to which the message 1 pertains. Since the transmission of the message 1 has been made without entering a transmission waiting state in the meantime (in the time period between the times T2 and T3), an increase/decrease in the margin time does not take place in the distributed control 1.

Thereafter, a request for the starting of the distributed control 2 on the node ND2 is issued at time T4, thus activating the processing on the task e. At this time, in comparison between the margin time for the distributed control 1 and the margin time for the distributed control 2, the margin time for the distributed control 2 is shorter and, hence, the task d (distributed control 1), which is in execution, is interrupted and is placed into an execution waiting state, the execution of the task e (distributed control 2) is made instead.

When the processing on the task e reaches completion at time T5, the starting of the transmission of a message 2 produced by the task e takes place, and the resuming of the processing on the task d interrupted takes place. Since the processing on the task e has been conducted without falling into an execution waiting state in the time period between the times T4 and T5, an increase/decrease in the margin time does not take place in the distributed control 2. On the other hand, since the processing on the task d has been placed into the execution waiting state and has been interrupted, the margin time for the distributed control 1 is shortened by a value corresponding to the interruption time (T5−T4).

When the processing on the task d resumed reaches completion at time T6, a request for the transmission of a message 3 produced by the task d occurs. At this time, because the message 2 belonging to the distributed control 2 with a shorter margin time is in transmission, the message 3 falls into a transmission waiting state.

Following this, in a case in which the communication of the message 2 reaches completion at time T7, upon receipt of this, the node ND3 starts the processing on the task h corresponding to the distributed control 2 to which the message 2 pertains while the node ND2 starts the transmission of the message 3 which is in the transmission waiting state. Since the transmission of the message 2 has been made without falling into the transmission waiting state in the meantime (between the times T5 and T7), an increase/decrease in the margin time does not take place in the distributed control 2. On the other hand, since the message 3 is in the transmission waiting state from when the processing on the task d reaches completion (T6) until the transmission of the message 2 reaches completion (T7), the margin time for the distributed control 1 is decreased by a value corresponding to the waiting time (T7−T6).

Subsequently, in a case in which the communication of the message 3 reaches completion at time T8, upon receipt of this, the node ND3 activates the processing on the task g corresponding to the distributed control 1 to which the message 3 pertains. At this time, since the processing on the task h pertaining to the distributed control 2, which has a shorter margin time, has already been put in execution, the task g falls into an execution waiting state.

Thereafter, when the processing on the task h reaches completion at time T9, the transmission of a message 4 produced by the task h starts and the processing on the task g which has been in the execution waiting state starts. In the meantime (between times T7 and T9), since the processing on the task h has been conducted without falling into the execution waiting state, the margin time for the distributed control 2 does not increase nor decrease. On the other hand, since the task g has fallen into the execution waiting state from the completion of the communication of the message 3 (T8) to the completion of the processing on the task h (T9), the margin time for the distributed control 1 is decreased by a value corresponding to the waiting time (T9−T8).

When the communication of the message 4 reaches completion at time T10, upon receipt of this, the node ND1 starts the processing on the task c corresponding to the distributed control 2 to which the message 4 pertains, and when the processing on the task c reaches completion at time T12, a series of processing for the distributed control 2 comes to an end. In the meantime (between times T9 and T12), since each of the message 4 and the task c is processed without falling into the communication waiting state or the execution waiting state, the margin time for the distributed control 2 does not increase nor decrease and the distributed control 2 is eventually processed in a time period which satisfies the deadline condition.

In addition, the processing on the task g reaches completion at time T11, which leads to the completion of a series of processing for the distributed control 1. In the meantime (between times T9 and T11), since the processing thereon is conducted without entering the execution waiting state, the margin time for the distributed control 1 does not increase nor decrease. Eventually, the margin time for the distributed control 1 is decreased by (T5−T4)+(T7−T6)+(T9−T8), and the distributed control 1 is processed in a time period which satisfies the deadline condition.

As described above, in the distributed control system according to this embodiment, with respect to each of the distributed control to be executed on the system, a processing time for the tasks needed for the execution of the distributed control and a margin time representative of a difference between an estimated completion time Tsp obtained by summing up all the WCETs of the message transmission times and the time Tcy having a length up to the deadline for that distributed control are set, and the tasks or the messages are processed or transmitted by priority in the order of lengthening margin time.

That is, unlike the conventional system in which a task set at a low priority is postponed at all times, the priorities of the tasks and the messages always vary so that all the distributed control satisfy their deadline condition.

Accordingly, even without determining the processing time of each task and the transmission time of each message in advance, the task processing and the message transmission can be conducted with high efficiency in such an order as to satisfy the deadline condition.

In consequence, if the result of the actual operation of the system shows that difficulty is encountered in fulfilling the deadline condition, there is no need to change the design taking the priority of the task or the message into consideration but it is covered simply by speeding up the CPU processing frequency or the message transmission rate by a delay with respect to the deadline, which considerably reduces the number of steps of development for a distributed control system.

In addition, in this embodiment, when the margin time is less than an execution discontinuation decision value or a transmission discontinuation decision value, the execution of the corresponding task or the transmission of the corresponding message is discontinued to suspend that distributed control.

Thus, this avoids the reduction of the margin time for other distributed control stemming from the continuous execution of the distributed control which obviously violates the deadline condition, thereby definitely preventing adverse influence on the other distributed control.

Still additionally, in this embodiment, time information corresponding to the margin time, together with a message, is inserted into a frame and the time information is used as information whereby a priority is determined in conducting the arbitration, while a message for the distributed control having a shorter margin time is transmitted by priority even on the transmission line, thus considerably reducing the possibility of the distributed control with a shorter margin time being suspended halfway because of the violation of the deadline condition.

Second Embodiment

Secondly, a description will be given hereinbelow of a second embodiment of the present invention.

In this embodiment, the composition of a task to be executed and a portion of the processing to be executed by the margin time updating unit 16 differ from those in the above-described first embodiment, and the description will principally be given of only the different sections.

That is, in this embodiment, as tasks to be managed by the task control unit 14, in addition to normal tasks to be executed ordinarily, there are simplified tasks made to be shorter in execution time than the normal tasks in a manner such that a portion of the processing on the normal task is omitted or the processing thereon is replaced with a simpler one.

Figure 4:
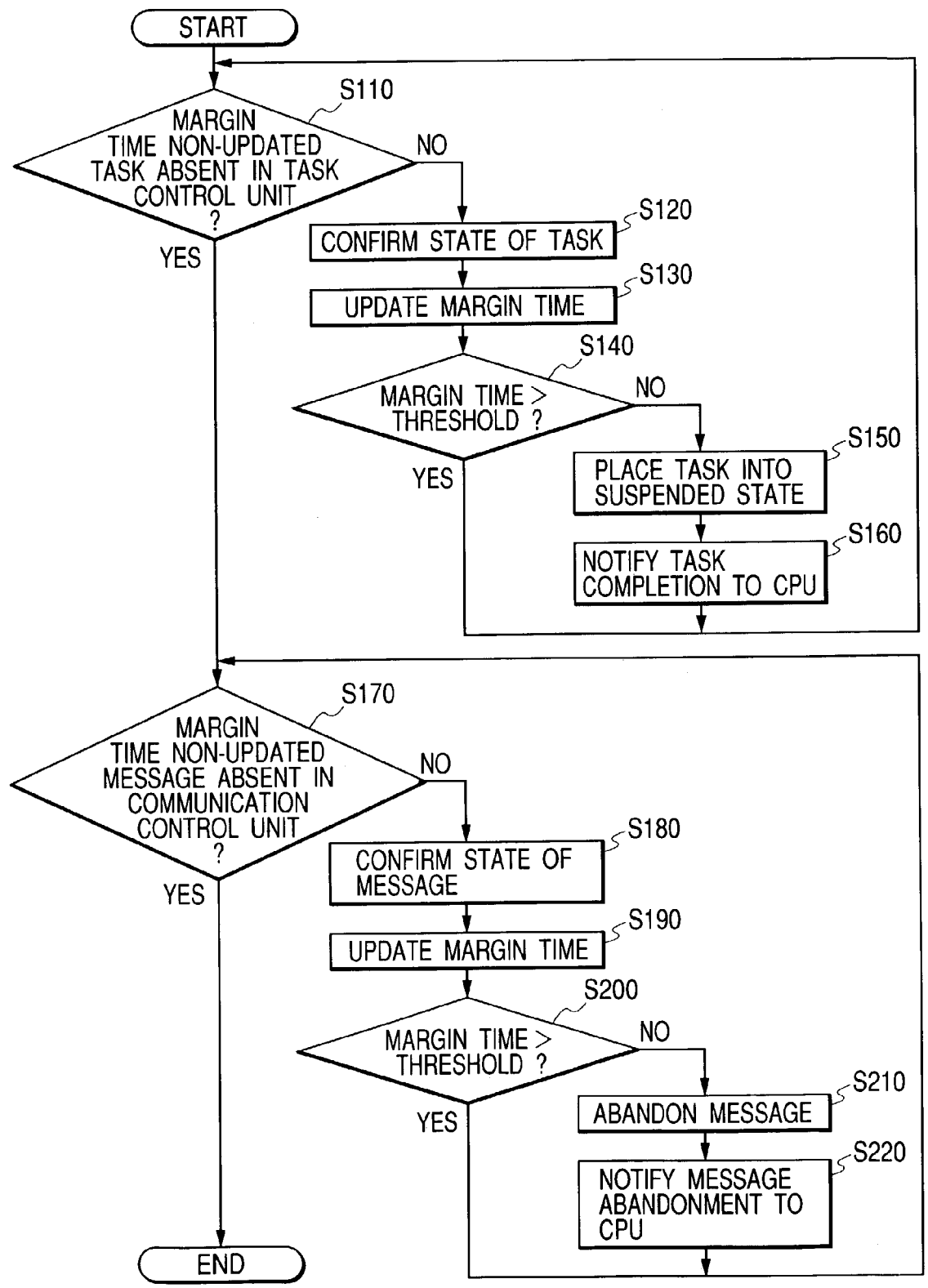
FIG. 4 is a flow chart showing the outline of processing to be conducted in a margin time updating unit.

In addition, in a case in which the decision of the step S140 of FIG. 4 in the first embodiment indicates that the margin value is larger than an execution discontinuation decision value, when that margin value is smaller than a task switching decision value set in advance and the task is in an execution waiting state, and if that task is a normal task, the margin time updating unit 16 makes the switching from that normal task to a simplified task.

Likewise, in a case in which the decision of the step S200 of FIG. 4 in the first embodiment indicates that the margin value is larger than a transmission discontinuation decision value, when that margin value is smaller than a message switching decision value set in advance and the message is not actually transmitted, and if that task is a normal task, that normal task is switched to a simplified task.

The simplified message signifies partial omission from information to be included in a message, and when receiving this simplified message, the task processes the omitted information through the use of a default value, a value used in the previous processing, a value estimated from that value, or the like.

Referring to a timing illustration of FIG. 11, a description will be given hereinbelow of examples of a task control operation and a communication control operation in each of the nodes of the distributed control system according to this embodiment.

Figure 12:
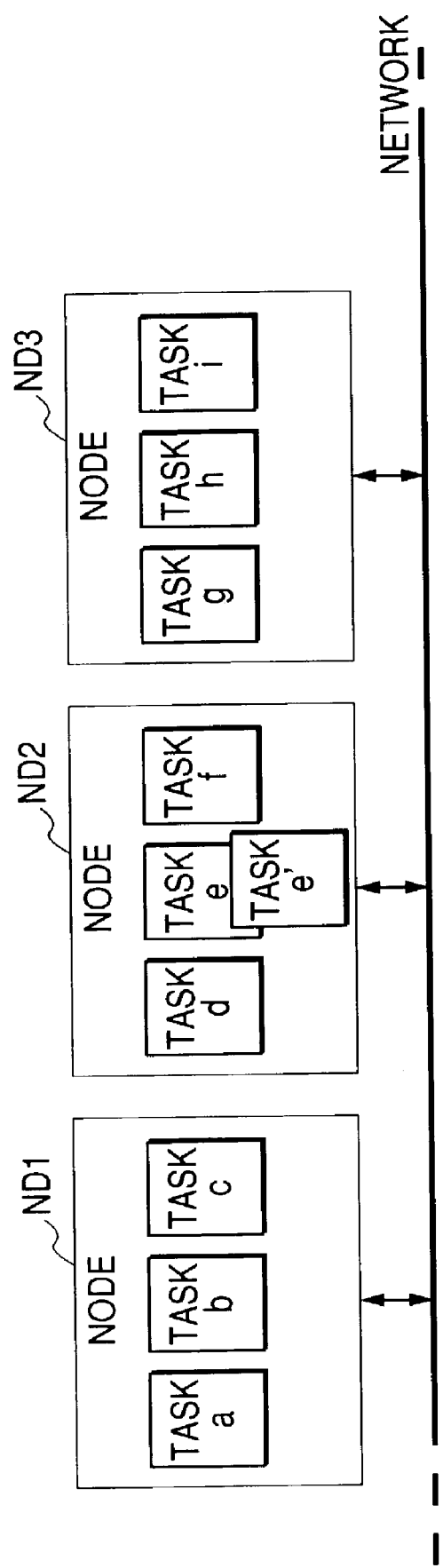
FIG. 12 is an illustration useful for explaining a system configuration for providing the operation shown in FIG. 11.

However, although, as shown in FIG. 12, this system configuration is approximately the same as that shown in FIG. 3A, with respect to the task e the node ND2 is to execute, there are a simplified task e', paired therewith, and a simplified message. Moreover, let it be assumed that distributed control 1 to be executed in the order of the task a (node ND1)→the task d (node ND2) and distributed control 2 to be executed in the order of the task e (node ND2)→the task i (node ND3) are implemented in parallel in the respective nodes ND1 to ND3.

In this case, for better understanding only, let it be assumed that all the tasks and all the messages are processed for a time according to a WCET used for the calculation of the initial value of the margin time. Moreover, let it be assumed that the task switching decision value and the message switching decision value are set at zero, and the execution discontinuation decision value and the transmission discontinuation decision value are set at a lower limit returnable to zero margin time when all the subsequent processing are conducted through the simplified tasks and the simplified messages. Still moreover, let it be assumed that no simplified task is prepared with respect to the task i and the execution discontinuation decision value therefor is set at zero.

Figure 11:
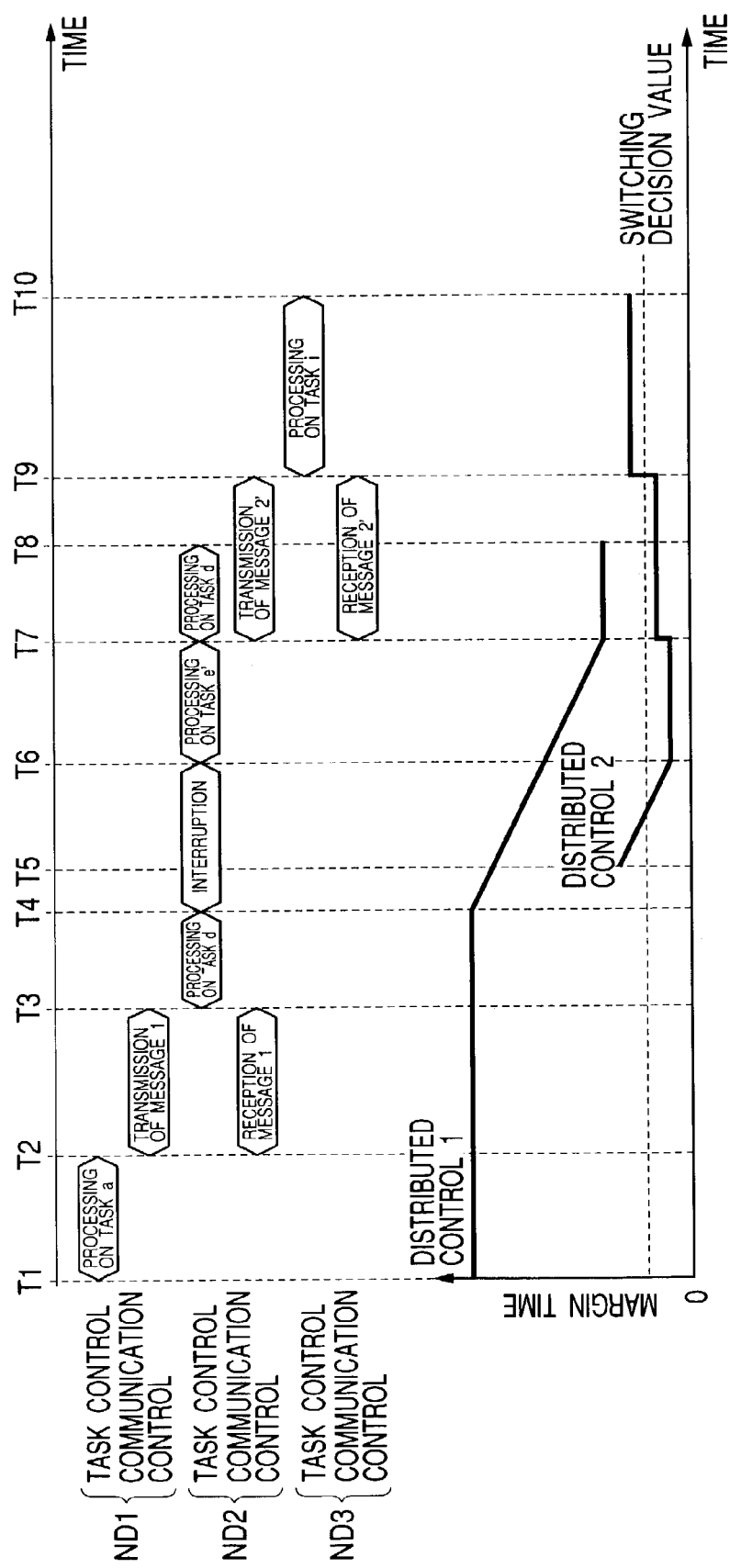
FIG. 11 is a timing chart showing an example of an operation of a distributed control system according to a second embodiment of the present invention.

As FIG. 11 shows, the processing to be conducted between time T1 and the T3 is entirely the same as that in the case of the first embodiment described above with reference to FIG. 10, and the description thereof will be omitted for brevity.

After the processing on the task d starts at time T3, when an external interruption occurs with respect to the node ND2 at time T4, the processing on the task d is interrupted and falls into an execution waiting state and the interruption processing starts.

In addition, when a request for the staring of the distributed control 2 is issued at time T5 during the execution of this interruption processing, the task e is activated. However, because of the execution of the interruption processing, the task e also falls into an execution waiting state.

Following this, the interruption processing comes to an end at time T6, of the tasks which are in an execution waiting state, a task pertaining to the distributed control 2, which has shorter margin time, is selected and the processing on that task starts. In the meantime (between time T4 and T6), since the task of the distributed control 2 enters an execution waiting state from its activation (T5) to the completion of the interruption processing (T6) and the processing thereon is suspended, the margin time for the distributed control 2 is decreased by a value corresponding to the suspension time (T6-T5). Thus, the margin time for the distributed control 2 becomes smaller than the task switching decision value and, hence, in the distributed control 2, the simplified task e' is implemented in place of the normal task e.

In a case in which the processing on this simplified task e' reaches completion at time T7, since the task e' comes to an end in a time period shorter than the WCET of the task e, the margin time for the distributed control 2 goes up a value corresponding to the difference therebetween. However, since this margin time is less than the message switching decision value, the transmission of a simplified message 2' starts in place of that of the normal message 2.

Concurrently with this, the processing on the task d, which has been interrupted, is resumed. In the meantime (between time T4 and time T7), since the task d has been in the execution waiting state and has been in the processing interrupted state, the margin time for the distributed control 1 goes down a value corresponding to the interruption time (T7-T4).

Following this, the processing on the task d resumed reaches completion at time T8, and a series of processing for the distributed control 1 terminates. In the meantime (between T7 and T8), since the task d is processed without falling into the execution waiting state, an increase/decrease in margin time for the distributed control 1 does not take place and, eventually, the distributed control 1 is implemented within a time fulfilling the deadline condition, although the margin time goes down a value (T7-T4).

Moreover, in a case in which the node ND3 receives the message 2' and the communication therefor comes to an end at time T9, since the communication of the message 2' reaches completion in a time period shorter than the WCET of the normal message 2, the margin time for the distributed control 2 goes up a value corresponding to the difference therebetween. Therefore, the margin value becomes larger than the execution discontinuation decision value and the processing on the task i starts.

When the processing on the task i comes to an end at time T10, a series of processing for the distributed control 2 terminates. In the meantime (between time T9 and T10), since the task i is processed without falling into the execution waiting state, an increase/decrease in margin time for the distributed control 2 does not occur. That is, although the margin time once becomes below zero, the distributed control 2 can finally be processed in a time period satisfying the deadline condition through the use of the simplified tasks and the simplified messages.

As described above, with the distributed control system according to this embodiment, with respect to each of the distributed control to be executed on the system, margin times are set so that a task or message with a shorter margin time is processed or transmitted by priority, and when the margin value is smaller than an execution discontinuation decision value or a transmission discontinuation decision value, the execution of the corresponding task or the transmission of the corresponding message is discontinued, thereby providing the same effects as those of the above-described first embodiment.

In addition, in this embodiment, when the margin value is smaller than a task switching decision value or a message switching decision value, the corresponding task or message is switched to a simplified task or simplified message taking a shorter execution time or shorter communication time.

Accordingly, even in a case in which it is expected from the margin time that difficulty is encountered in satisfying a deadline condition, the switching to a simplified task or a simplified message at that time can provide an extra margin time corresponding to the difference in time between the simplified task/message processing and the normal task/message processing, thus significantly reducing the possibility of the execution of the distributed control being discontinued halfway.

In other words, it is possible to seize the margin time with respect to the deadline of each distributed control at all times, which enables the expectation of the deadline violation and the QoS (Quality of Service) control based on the deadline violation, thus enhancing the fault tolerance of the system against failure, software bug or the like. Moreover, as compared with a conventional distributed control system using the real-time OS and CSMA/CA which does not take the deadline into consideration, even if the system load is larger, the assurance of the deadline becomes feasible.

FIG. 13 is an graphic illustration of simulation results for making a comparison in processing capability between the conventional system using the real-time OS and CSMA/CA and the distributed control system according to the above-described first embodiment.

Figures 14A, 14B:
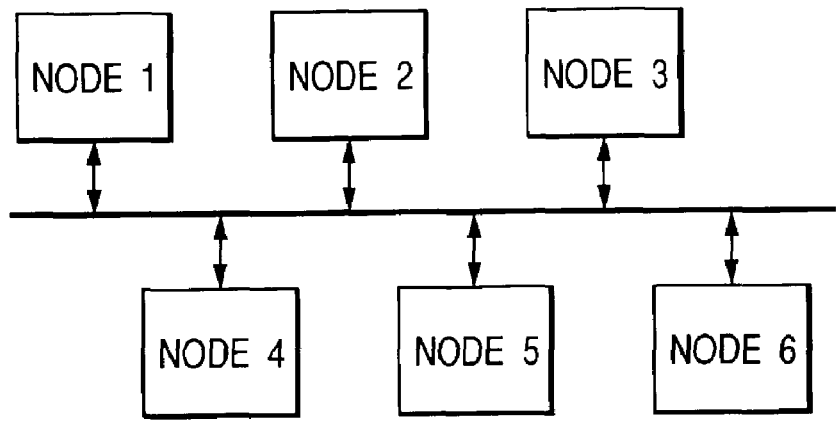
FIGS. 14A and 14B are illustrations of conditions for simulations.

In the simulation, a system comprising six nodes was assumed as shown in FIG. 14A and twelve distributed control were executed in parallel on the conditions (the number of tasks, the number of messages, control cycle) shown in FIG. 14B.

In FIG. 13, the horizontal axis shows an operating frequency of a CPU of each of nodes (the CPUs of all the nodes operate at the same frequency and the vertical axis indicates a communication rate when a message is transmitted. Moreover, the deadline assuring range of the distributed control system according to the present invention is shown by hatching of parallel oblique lines while the deadline assuring range of the conventional distributed system is indicated by hatching of oblique lines crossing each other.

From the simulation, in comparison with the conventional system, it was seen that the distributed control system according to the present invention can assure the deadline at a lower CPU operating frequency and at a lower communication rate.

It should be understood that the present invention is not limited to the above-described embodiments, and that it is intended to cover all changes and modifications of the embodiments of the invention herein which do not constitute departures from the spirit and scope of the invention.

What is claimed is:

1. A method of controlling distributed control executed in time sequence through mutual communication of messages by a plurality of tasks distributively executed on a plurality of nodes connected to a network for the communication and respectively made to implement parallel multitasking operations for the distributed control, the method comprising:

making each of the nodes set, with respect to each of said tasks executable on the respective nodes, a margin time representative of a difference between an estimated completion time of said distributed control relating to each executed task, and a deadline time of said distributed control;

making each of the nodes allocate a higher execution right preferentially to each of said tasks in an ascending order of the margin time;

determining whether or not an execution time of any of said tasks reaching completion of the execution does not reach a worst case execution time set in advance for said task;

when it is determined that the execution time of said task reaching completion of the execution does not reach a worst case execution time, increasing said margin time for said task by a value corresponding to a difference between said worst case execution time and said execution time and when it is determined that said execution time thereof exceeds said worst case execution time, decreasing said margin time for said task by said value corresponding to the difference therebetween.

2. The method according to claim 1, further comprising determining whether or not the margin time is smaller than a switching decision time set in advance; and when it is determined that said margin time is smaller than the switching decision time, switching the corresponding task from a normal task to be used in a normal condition to a simplified task shorter in execution time than said normal task.

3. The method according to claim 1, further comprising determining whether or not the margin time is smaller than a discontinuation decision time set in advance; and when it is determined that said margin time is smaller than the discontinuation decision value, discontinuing the execution of the corresponding task.

4. The method according to claim 1, wherein said margin time of said tasks waiting for acquisition of an execution right is shortened with a passage of time until said tasks acquire said execution right.

5. The method according to claim 1, further comprising: determining whether or not an execution time of said task acquiring an execution right overruns a worst case execution time set in advance for said task; and when it is determined that the execution time of said task acquiring the execution right overruns the worst case execution time, decreasing said margin time for said task with a passage of time until the execution of said task comes to an end.

6. The method according to claim 1, wherein in the making of the nodes to allocate, said margin time for said message waiting for acquisition of said communication right is decreased with a passage of time until said message acquires said communication right.

7. The method according to claim 1, further comprising:
   transmitting in said messages, time information indicative of said margin time for said messages together with said messages.

8. The method according to claim 7, wherein, in the making of the nodes to set, in setting said margin time for said task at the time of activation of said task, for a first task to be activated initially in said distributed control, an initial time of said margin time prepared in advance is set as said margin time, and for other tasks, other than the first task, to be activated upon receipt of said message, a time value based on said time information inserted into said message is set as said margin time.

9. The method according to claim 8, further comprising:
   transmitting said message through the use of a frame according to the CSMA/CA (Carrier Sense Multiple Access/Collision Avoidance) method on said network; and
   inserting said time information in an area of said frame to be used for arbitration control on said transmission line.

10. The method according to claim 8, further comprising:
    transmitting said message through the use of a frame according to the CSMA/CA (Carrier Sense Multiple Access/Collision Avoidance) method on said network;
    inserting said time information in an area of said frame to be used for arbitration control on said transmission line; and
    executing simultaneously both arbitration for communication in the plurality of nodes and transmitting said time information.

11. The method according to claim 1, wherein said margin time of said tasks waiting for acquisition of an execution right is shortened with a passage of time, and said tasks acquire said execution right at a time that said margin time of said tasks waiting for acquisition of the execution right below a margin time of the tasks currently having said execution right.

12. The method according to claim 1, wherein in the making of the nodes to allocate, said margin time for said message waiting for acquisition of said communication right is decreased with a passage of time, and said message acquires said communication right is below a margin time of the task currently having said communication right.

13. A method of controlling distributed control executed in time sequence through mutual communication of messages by a plurality of tasks distributively executed on a plurality of nodes connected to a network for the communication and respectively made to implement parallel multitasking operations for the distributed control, the method comprising:

making each of the nodes set, with respect to each of said tasks executable on the respective nodes, a margin time representative of a difference between an estimated completion time of said distributed control relating to each executed task, and a deadline time of said distributed control; and making each of the nodes allocate a higher execution right preferentially to each of said tasks in an ascending order of the margin time;

determining whether or not said margin time is smaller than a switching decision value set in advance; and when it is determined that said margin time is smaller than the switching decision value, switching the corresponding message from a normal message to be used at an ordinary condition to a simplified message smaller in size than said normal message, wherein in the making of the nodes to allocate, on the basis of said margin time for said distributed control to which each of messages transmittable pertains, each of said nodes allocates a message transmission right preferentially to each of said messages in the ascending order of the margin time.

14. A method of controlling distributed control executed in time sequence through mutual communication of messages by a plurality of tasks distributively executed on a plurality of nodes connected to a network for the communication and respectively made to implement parallel multitasking operations for the distributed control, the method comprising:

making each of the nodes set, with respect to each of said tasks executable on the respective nodes, a margin time representative of a difference between an estimated completion time of said distributed control relating to each executed task, and a deadline time of said distributed control; and making each of the nodes allocate a higher execution right preferentially to each of said tasks in an ascending order of the margin time;

determining whether or not an estimated communication time to be taken from which said communication right is acquired until the communication comes to an end in the case of assuming that the transmission is made successfully at the next transmission occasion does not reach a worst case communication time set in advance;

when it is determined that the estimated communication time does not reach the worst case communication time, increasing said margin time for said message by a value corresponding to a difference between said worst case communication time and said estimated communication time; and when it is determined that said estimated communication time exceeds said worst case communication time, decreasing said margin time for said message by said value corresponding to said difference therebetween, wherein in the making of the nodes to allocate, on the basis of said margin time for said distributed control to which each of messages transmittable pertains, each of said nodes allocates a message transmission right preferentially to each of said messages in the ascending order of the margin time.

15. A distributed control apparatus implemented in each of a plurality of nodes communicably connected to a network so that the nodes communicate with each other through the network to distributedly execute a plurality of tasks, in which each node is made to implement multitasking operations and each task communicates a message with other tasks to be executed on another node for cooperatively executed distributed control, said distributed control apparatus comprising:

task scheduling means for, i) scheduling, on the basis of a margin time representative of a difference between an estimated completion time of said distributed control relating to each executed task, and a deadline time of said distributed control, and ii) allocating an execution right preferentially to each of said tasks, placed into an executable state, in an ascending order of the margin time;

message transmitting/receiving means for transmitting/receiving said message produced by said task and time information representative of said margin time for said message, inserted into said message, through said network and for, when receiving a message, issuing a request to one of the plurality of nodes for activation of said task corresponding to said message to said task scheduling means;

activation time setting means for, when said task is activated by said task scheduling means and when said task is a first task to be initially executed in said distributed control, setting an initial value of said margin time prepared in advance as said margin time for said task and for, when said task is other than said first task and is activated in response to reception of said message, setting a value based on said time information inserted into said message as said margin time for said task; and first updating means for sequentially updating said margin time, set by said activation time setting means, in accordance with an execution state of each of said tasks by said task scheduling means.

16. The apparatus according to claim 15, further comprising message scheduling means for, on the basis of said margin time for each of said messages, allocating a message transmission right in said message transmitting/receiving means preferentially to each of said messages in an ascending order of the margin time.

17. The apparatus according to claim 15, further comprising second updating means for sequentially updating said margin time, set by said activation time setting means, in accordance with an execution state of the transmission of each of said messages by said message transmitting/receiving means.

18. A distributed control apparatus implemented in each of a plurality of nodes communicably connected to a network so that the nodes communicate with each other through the network to distributedly execute a plurality of tasks, in which each node is made to implement multitasking operations and each task communicates a message with other tasks to be executed on another node for cooperatively executed distributed control, said distributed control apparatus comprising:

task scheduling means for, i) scheduling, on the basis of a margin time representative of a difference between an estimated completion time of said distributed control relating to each executed task and a deadline time of said distributed control , ii) allocating an execution right preferentially to each of said tasks, placed into an executable state, in an ascending order of the margin time, iii) transfer said execution right for said task being executed, to a new task when the margin time of said new task reaches below said margin time of said tasks being executed;

message transmitting/receiving means for transmitting/receiving said message produced by said task and time information representative of said margin time for said message, inserted into said message, through said network, executing simultaneously both arbitration for communication in the plurality of nodes and transmitting said time information and issuing a request to one of the plurality of nodes for activation of said task corresponding to said message to said task scheduling means;

message scheduling means for, on the basis of said margin time for each of said messages waiting for a message transmission right, allocating said message transmission right in said message transmitting/receiving means preferentially to each of said messages in the ascending order of the margin time, and when an event occurs for a message has a smaller margin time than said margin time of said message currently transmitting with said transmission right, issuing a request for starting transmitting of said message having said smaller margin time to said message transmitting/receiving means;

activation time setting means for, when said task is activated by said task scheduling means and when said task is a first task to be initially executed in said distributed control, setting an initial value of said margin time prepared in advance as said margin time for said task and for, when said task is other than said first task and is activated in response to reception of said message, setting a value based on said time information inserted into said message as said margin time for said task; and first updating means for sequentially updating said margin time, set by said activation time setting means, in accordance with an execution state of each of said tasks by said task scheduling means.

* * * * *